Nov. 11, 1969    W. M. ICKE ET AL    3,477,678
UNIVERSAL VEHICLE SUN VISOR MOUNT
Filed Dec. 1, 1966
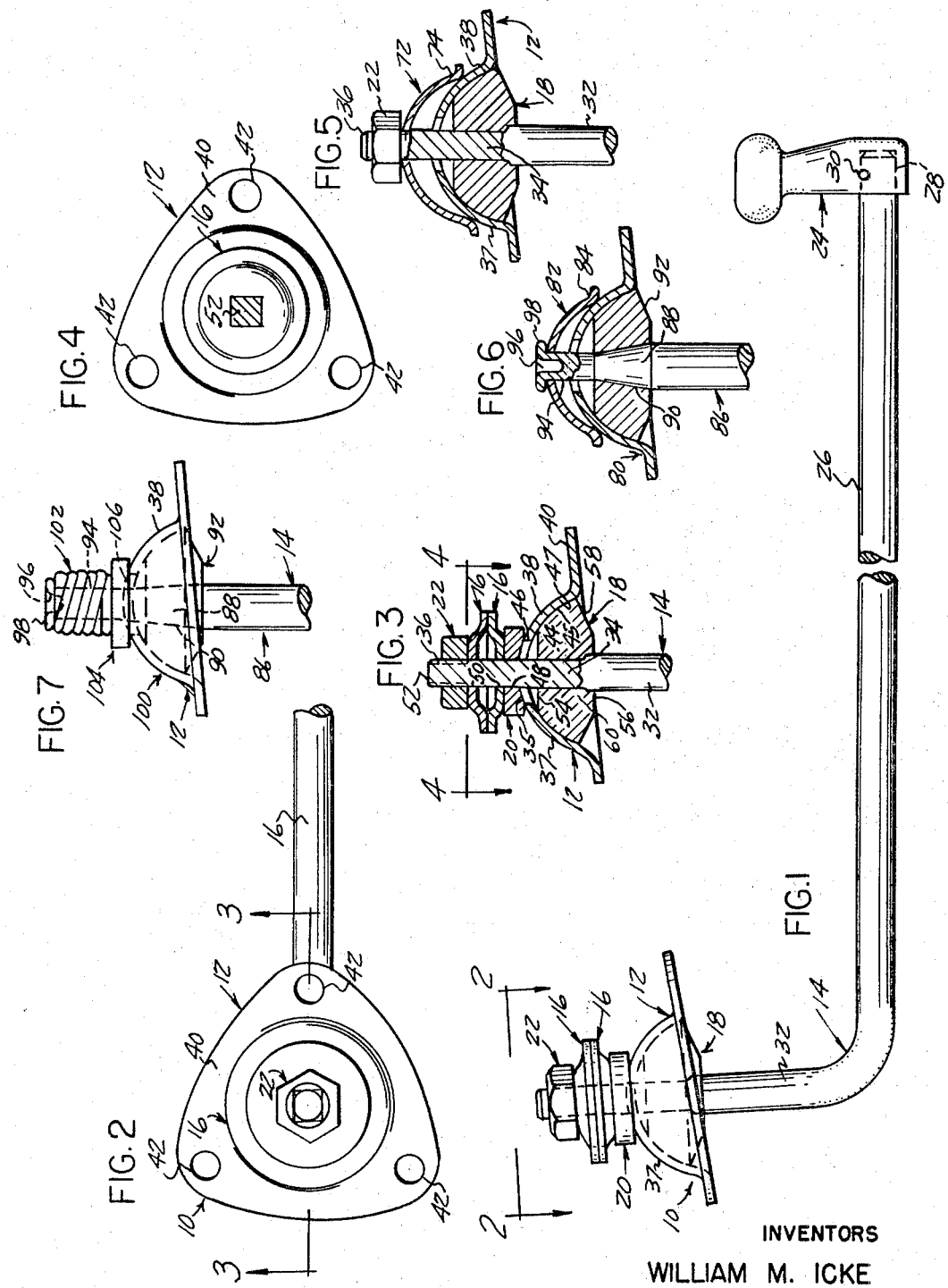
INVENTORS
WILLIAM M. ICKE
HARRY C. VERYSER
BY Barthel & Bugbee
ATTORNEYS United States Patent Office 3,477,678
Patented Nov. 11, 1969

3,477,678
UNIVERSAL VEHICLE SUN VISOR MOUNT
William M. Icke, 41 N. Duval Road, Grosse Pointe Shores, Mich. 48236, and Harry C. Veryser, Mount Clemens, Mich.; said Veryser assignor to said Icke
Filed Dec. 1, 1966, Ser. No. 598,454
Int. Cl. B60j 3/02
U.S. Cl. 248—288     4 Claims

ABSTRACT OF THE DISCLOSURE

An elongated arm of an L-shaped rod carries a sun visor while the shorter bent arm passes through a hole in a ball consisting of a segment of a sphere rockably seated in a concave spherical bracket plate. The bent rod portion passes through a hole in a compression spring device including either a pair of abutting cone spring washers facing one another or a single cone spring washer (FIGURES 5 and 6) or a helical spring (FIGURE 7), and has its outer end enlarged either by being threaded at its corners to receive a threaded nut and squared where it passes through the ball (FIGURES 1 to 5) or recessed and upset at its upper end (FIGURES 6 and 7). The modifications shown in FIGURES 6 and 7 employ a tapered rod portion fitting a tapered bore in the ball with the upper end recessed and upset or enlarged to retain the single cone washer of FIGURE 6 or the helical spring of FIGURE 7.

BACKGROUND OF THE INVENTION

The field of the invention is that of vehicle sun visors adapted to be mounted on the header above the vehicle windshield. The prior art includes angle rods, one arm of which tiltably supports the sun visor and the other passes through a hole in a mounting bracket which is ordinarily of die-cast metal and is spring-pressed against the bracket by a helical compression spring thus enabling the rod to be swung from a position parallel to a position perpendicular to the windshield to intercept light coming through the side windows of the vehicle.

SUMMARY OF THE INVENTION

The present universal vehicle sun visor mount, the construction of which is summarized above in the abstract of the disclosure, has the advantage of being tiltable in any direction so that it can be mounted horizontally so as to project horizontally from the windshield header or vertically so as to depend from the header. The universal ball mounting eliminates the need for right-hand or left-hand mounts, as a single mount suffices for both purposes. The squared arm of the angle rod "indexes" the various parts mounted thereon and this prevents relative rotation of these parts, which has previously caused unscrewing and consequent loosening of the nut. The cone spring washers occupy much less space axially than helical springs and also apply an even pressure on the ball. The ball is preferably formed of sintered powdered metal rather than die cast metal, the softness of which has previous permitted penetration of the rod into the ball, with consequent loosening.

In the drawings:

FIGURE 1 is a front elevation of a universal sun visor mount, according to one form of the invention;

FIGURE 2 is a fragmentary top plan view, looking in the direction of the arrows 2—2 in FIGURE 1;

FIGURE 3 is a fragmentary central vertical longitudinal section taken along the line 3—3 in FIGURE 2, with the threaded square rod portion shown in side elevation;

FIGURE 4 is a vertical cross-section taken along the line 4—4 in FIGURE 3;

FIGURE 5 is a view similar to FIGURE 3, but of a modification employing a single cone spring washer;

FIGURE 6 is a view similar to FIGURE 3, but of a modification employing a tapered rod portion fitting a tapered bore in the ball and employing a single cone spring washer retained by a recessed and enlarged upper rod end; and FIGURE 7 is a view similar to FIGURE 6, but of a modification employing a helical compression spring.

Referring to the drawing in detail, FIGURES 1 to 4 inclusive show a universal vehicle sun visor mount, generally designated 10, according to one form of the invention as consisting generally of a bracket or mounting plate 12, a visor rod 14, a pair of oppositely-facing cone spring washers 16, a ball 18, a concave thrust or abutment washer 20 and a threaded nut 22. Mounted on the outer end of the visor rod 14 is a finger 24 which normally is hooked over the rear view mirror or some part of the header to prevent undesired swinging of the visor rod 14 during travel.

The visor rod 14 has an elongated visor-carrying arm 26, the outer end of which is fitted into a socket 28 with a drive fit and its outer end portion is tangentially grooved for the passage of a cross pin 30 which passes through the correspondingly-drilled finger 24 and prevents the latter either from turning or from coming off. The shorter or bent arm 32 terminates in a squared portion 34 which is also threaded at its corners 36 to threadedly receive the nut 22 which tightens the two flanged cone spring washers 16 down against the concave washer 20, the lower concave spherical surface 35 of which is configured to fit the outer spherical surface 37 of the convex spherical portion 38 of the bracket 12 (FIGURE 3), the flange 40 of which is drilled at 42 for reception of fasteners (not shown). The squared portion 34 of the arm 32 passes through a correspondingly squared hole 44 (FIGURE 3) in the ball 18, which has an outer convex spherical surface 45 fitting the ball socket or inner concave spherical surface 47 in the portion 38 of the bracket 12. The squared portion 34 also passes through an enlarged hole 46 and through correspondingly square holes 48 and 50 in the concave thrust or abutment washer 20 and cone spring washers 16 respectively.

For convenience of description, the sun visor mount 10 has been shown in the position which it would occupy if installed depending from the header in the vehicle body above the windshield. It will be understood, however, that in many, if not the majority of installations, the bracket 12 would be installed in a vertical position against the header so that FIGURE 1 would then represent a top plan view, rather than a front elevation.

In either instance, the windshield header (not shown) is bored to provide a hole or recess of sufficient depth to accommodate the portion between the flange 40 and the end 52 of the squared arm portion 34. The bracket 12 is then secured in this position with the members 38, 20, 16 and 22 within the recess, whereupon screws or other fasteners are inserted through the holes 42 to secure the device to the windshield header.

The ball 18, while so designated, is, as will be seen from FIGURES 1 and 3, not a complete sphere but rather a segment of a sphere bounded by parallel inner and outer surfaces 54 and 56, the latter having a conical peripheral surface 58 to provide clearance for the tilting of the ball 18 relatively to the windshield header. The pressure exerted by the cone spring washers 16, which are of convexo-concave shape with flanged peripheries, is adjusted by tightening or loosening the nut 22 on the threaded part 36 of the squared arm portion 34. The concave washer 20 serves as an abutment for the lower cone spring washer 16, the upper one engaging the nut 22 as an abutment.

In operation, the user, by grasping the elongated arm 26 of the visor rod 14, can either swing the arm 26 around the axis of the perpendicular portion 32 which thereupon, together with the ball 18 serves as a pivot shaft, or, alternatively, he can rock the visor rod 14 relatively to the bracket 12 with the convex surface 45 of the ball 18 engaging the concave surface 47 of the portion 38 of the bracket 12. At the same time, the concave thrust or abutment washer 20 has surface-to-surface engagement with the convex portion 38. If the user so desires, he can both swing and rock the visor rod 14 by a combination of the above movements. In this manner, and because of the universal mounting thus provided, the same device 10 can be used either for the right-hand or left-hand position on the windshield header so as to protect either the driver or the front seat passenger of the vehicle from sun glare, either from the front through the windshield or from the side through the forward side windows. The device 10 is also universal in the sense that it can be tilted in any direction desired, and is not limited to rotation around an axis.

Because of the greater hardness of the sintered powdered iron ball 18 as compared with a die cast bracket, the rearward arm 32 of the visor rod 14 will not work its way into the ball 18 and thus loosen the nut 22, nor will an additional washer be required at that location, as in the prior art. In contrast to the prior art, the rod portion 32 will remain in its original position without such penetration, because of the shoulder at 60 between the lower or outer round portion of the rod arm 32 and the upper or inner squared portion 34 thereof and the greater hardness of the sintered powdered iron ball. The ball joint thus provided also avoids any collision between the visor and the roof trim or header or any other part of the vehicle body during tilting or swinging. The pressure exerted between the ball 18 and the convexo-concave portion 38 of the bracket 12 can be accurately adjusted to a predetermined amount by threading the nut 22 onto the square threaded portion 36 of the arm 32 by means of a torque wrench or nut driver with controllable torque. Such wrenches and nut drivers are well known to those skilled in the machine art. The cone spring washers 16 are provided with peripheral flanges engaging one another so that accurate tolerances can be maintained between the center and the periphery thereof. The butt 22 remains in position without the need for applying a cement, as is frequently required with prior sun visor mounts.

The modified universal sun visor mounts, generally designates 70, 80 and 100 respectively, shown in FIGURES 5, 6 and 7 are in most respects similar to that shown in FIGURES 1 to 4 inclusive, hence similar parts are designated with the same reference numerals. The visor mount 70 of FIGURE 5, however, differs from the visor mount 10 of FIGURE 3 by replacing the double cone spring washers 16 and concave contact washer 20 with a single downwardly-facing cone spring washer 72, the outwardly-flared rim portion 74 of which directly engages the outer or convex spherical surface 37 of the convex spherical portion 38 of the bracket 12. The tightening or loosening of the nut 22 on the threaded corner portion 36 of the squared portion 34 of the bent arm 32 adjusts the pressure with which the flared rim portion 74 of the single cone washer 72 engages the spherical bracket portion 38.

The visor mount 80 of FIGURE 6 differs from the visor mount 10 of FIGURE 3 by also replacing the double cone spring washers 16 and concave contact washer 20 with a single downwardly-facing cone washer 82 with an outwardly-flared rim 84 similar to the spring washer 72 and flared rim 74 of FIGURE 5. The bent arm 86 of the visor mount 80, however, instead of being squared as at 34 in FIGURE 3 is tapered as at 88 to fit a correspondingly-tapered bore 90 in the ball 92, beyond which it proceeds upward in a reduced diameter straight portion 94 which terminates in a recess 96 and outwardly-enlarged "staked" or "upset" outer end 98 to retain the single cone spring washer 82 in position.

The visor mount 100 of FIGURE 7 is similar to the visor mount 80 of FIGURE 6 in that it has the bent arm portion 86 thereof with its tapered portion 88, straight upper portion 94, recessed upper end 96 and enlargement 98 thereon and the tapered portion 88 also fits a tapered bore 90 in the ball 92. In place of the single cone spring washer 82 of FIGURE 6, however, the visor mount 100 of FIGURE 7 employs a helical compression spring 102, the upper end of which abuts the enlarged "staked" or "upset" upper end 98 of the bent rod arm 86 whereas the lower end engages a concave thrust and abutment washer 104 loosely mounted on the straight reduced diameter upper portion 94 and having a concave lower contact surface 106 mating with and engaging the convex portion 38 of the bracket 12.

The respective operations of the modified sun visor mounts 70, 80 and 100 of FIGURES 5, 6 and 7 are similar to that of the sun visor mount 10 of FIGURE 3. These modifications, however, result in a somewhat lower cost of manufacture because of the somewhat simpler construction, due to the elimination of the second spring washer 16 and thrust washer 20 in FIGURE 5, and of the nut 22 and threading 36 in FIGURES 6 and 7, but the advantage of the adjustment of the pressure is lacking in FIGURES 6 and 7.

We claim:
1. A universal vehicle sun visor mount, comprising
   a bracket member having a convexo-concave portion with a spherical ball socket therein and an enlarged opening therethrough communicating with said socket,
   a ball member consisting substantially of a segment of a sphere having on one side thereof a convex spherical surface rockably engaging said socket and having on the opposite side thereof a flatter surface approximately level with the edge of said ball socket and having a bore therethrough alignable with said opening,
   an angle rod having an elongated forward arm disposed on the opposite side of said ball member from said convex spherical surface thereof and adapted to receive and carry the sun visor and having a shorter rearward bent arm disposed angularly to said forward arm,
      said rearward arm being disposed partially in and projecting through said ball member bore and through said bracket member opening and having an exposed portion extending beyond said convex spherical surface of said ball member and beyond said bracket member,
   an inner spring abutment slidably mounted on said exposed portion and having a concave contact surface disposed in mating engagement with the convex surface of said convexo-concave portion,
   an outer spring abutment disposed on the end of said exposed portion,
   and a spring thrust device disposed on said exposed portion between said outer spring abutment and said inner spring abutment,
      said spring device including a pair of cone spring washers disposed with their peripheries facing one another with one of said cone spring washers engaging said inner spring abutment and urging the same against said convexo-concave portion.

2. A universal vehicle sun visor mount, comprising
   a bracket member having a convexo-concave portion with a spherical ball socket therein and an enlarged opening therethrough communicating with said socket, a ball member having a convex spherical surface rockably engaging said socket and having a bore therethrough alignable with said opening, an angle rod having an elongated forward arm adapted to receive and carry the sun visor and having a shorter rearward bent arm disposed angularly to said forward arm, said rearward arm being disposed partially in and projecting through said ball member bore and through said bracket member opening and having an exposed portion extending therebeyond, an inner spring abutment slidably mounted on said exposed portion and having a concave contact surface disposed in mating engagement with the convex surface of said convexo-concave portion, an outer spring abutment disposed on the end of said exposed portion, and a spring thrust device disposed on said exposed portion between said outer spring abutment and said inner spring abutment, means being provided between said ball member and said exposed portion for preventing relative rotation therebetween while permitting sliding motion of said ball member along said exposed portion.

3. A universal vehicle sun visor mount, according to claim 2, wherein said means includes a portion of non-circular cross-section on said rearward arm and also includes a bore of corresponding non-circular cross-section in said ball member and a hole of corresponding non-circular cross-section in said inner abutment member.

4. A universal vehicle sun visor mount, according to claim 3, wherein said spring device includes a pair of cone spring washers disposed with their peripheries facing one another, and wherein said spring washers have holes therethrough of non-circular cross-section corresponding to said non-circular cross-section portion of said rearward arm and the hole of non-circular cross-section in said inner abutment member.

References Cited

UNITED STATES PATENTS

| | | | |
|---|---|---|---|
| 1,407,118 | 2/1922 | Bennett | 287—21 X |
| 2,121,317 | 6/1938 | Cohen | 248—288 X |
| 2,121,525 | 6/1938 | Johnson | 248—288 X |
| 2,465,751 | 3/1949 | Robins | 248—288 X |
| 2,167,962 | 8/1939 | Sovis | 248—288 |

FOREIGN PATENTS 855,251  11/1960  Great Britain.

ROY D. FRAZIER, Primary Examiner

F. DOMOTOR, Assistant Examiner

U.S. Cl. X.R.

296—97